(12) United States Patent
Luo

(10) Patent No.: US 7,961,937 B2
(45) Date of Patent: Jun. 14, 2011

(54) PRE-NORMALIZATION DATA CLASSIFICATION

(75) Inventor: Huitao Luo, Fremont, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 976 days.

(21) Appl. No.: 11/259,817

(22) Filed: Oct. 26, 2005

(65) Prior Publication Data
US 2007/0092133 A1    Apr. 26, 2007

(51) Int. Cl.
*G06K 9/62* (2006.01)
(52) U.S. Cl. ........ 382/159; 382/181; 382/224; 382/226; 382/227; 706/20; 706/21
(58) Field of Classification Search .......... 382/155, 382/158, 159, 181, 224–228
See application file for complete search history.

(56) References Cited

U.S. PATENT DOCUMENTS

| | | | | |
|---|---|---|---|---|
| 5,164,992 | A * | 11/1992 | Turk et al. ............... | 382/118 |
| 5,710,833 | A * | 1/1998 | Moghaddam et al. ....... | 382/228 |
| 5,982,912 | A * | 11/1999 | Fukui et al. .............. | 382/118 |
| 7,050,942 | B2 * | 5/2006 | Hirayama et al. .......... | 702/186 |
| 7,218,759 | B1 * | 5/2007 | Ho et al. ................. | 382/118 |
| 7,324,670 | B2 * | 1/2008 | Kozakaya et al. .......... | 382/118 |
| 7,508,961 | B2 * | 3/2009 | Chen et al. ............... | 382/118 |
| 2002/0038307 | A1 | 3/2002 | Obradovic et al. | |
| 2002/0159627 | A1 | 10/2002 | Schneiderman et al. | |
| 2002/0159643 | A1 | 10/2002 | DeYong et al. | |
| 2002/0168098 | A1 | 11/2002 | DeYong et al. | |
| 2003/0110147 | A1 | 6/2003 | Li et al. | |
| 2004/0013286 | A1 * | 1/2004 | Viola et al. .............. | 382/118 |
| 2004/0190775 | A1 * | 9/2004 | Miller .................... | 382/190 |
| 2005/0013479 | A1 | 1/2005 | Xiao et al. | |
| 2006/0083423 | A1 * | 4/2006 | Brown et al. ............. | 382/159 |

OTHER PUBLICATIONS

Viola, P. et al., "Robust Real-Time Object Detection", Second International Workshop on Statistical and Computational Theories of Vision, Jul. 13, 2001, pp. 1-20.*
Freund, Y. et al., "A short introduction to boosting", Journal of Japanese Society for Artificial Intelligence, Sep. 1990, vol. 14, No. 5, pp. 771-780.
Viola, P. et al., "Robust real-time object detection", Second Int'l Workshop on Statisical and Computational Theories of Vision, Jul. 13, 2001, pp. 1-20.

* cited by examiner

*Primary Examiner* — Matthew C Bella
*Assistant Examiner* — Eric Rush

(57) ABSTRACT

Provided are systems, apparatuses, methods and techniques for recognizing a pattern within input data, such as a specific object within an image frame. Prior to normalizing the input data, normalization-independent classification is performed, thereby rejecting a number of potential windows early on and resulting in a corresponding reduction in required processing.

26 Claims, 6 Drawing Sheets

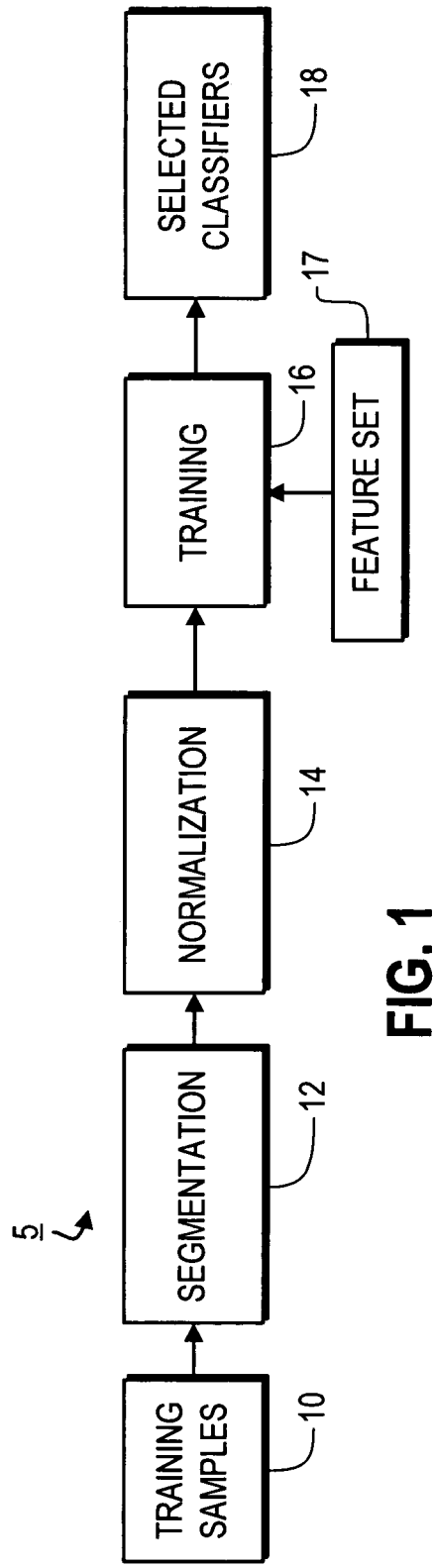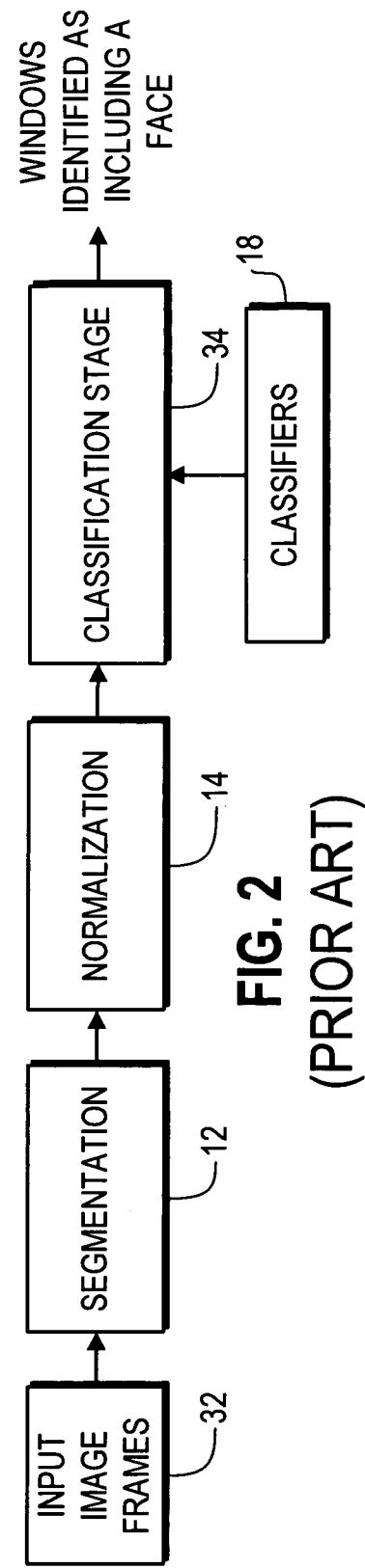

PRE-NORMALIZATION DATA CLASSIFICATION

FIELD OF THE INVENTION

The present invention pertains to recognition of patterns within input data.

BACKGROUND

Conventionally, tools have existed to search text-based databases for specified words, word fragments, phrases, etc. More recently, effort has been devoted to achieving similar results with respect to collections of electronic images. Thus, for example, one might like to conduct an automated search of an archive of millions of digital photographs in order to find all of the photographs that include an image of a person's face.

One known approach to object detection uses a prediction technique to generate multiple feature classifiers from a set of training image frames and then uses those classifiers for detecting faces. An example of a training approach 5 for generating the feature classifiers is illustrated in FIG. 1. Training samples 10, consisting of a number of image frames, initially are input into a segmentation stage 12. In segmentation stage 12, various individual windows are identified for each image frame, each such window being a sub-portion of the subject image frame. Each output window is normalized 14 and then subject to training 16 to obtain, based on an available set of features (or predictors) 17, multiple classifiers 18. Each such classifier 18 generally is based on multiple features selected from set 17.

An object detector 30 that subsequently is constructed using the classifiers 18 generated in accordance with training approach 5 is illustrated in FIG. 2. Input image frames 32 consist of a number of individual image frames in which one would like to identify any images of people's faces. Each input image frame 32 is segmented 12 and then normalized 14 in the same manner as was used for training data 10. Finally, using the identified classifiers 18, a determination is made in classification stage 34 as to whether or not each normalized window contains an image of a person's face.

While the foregoing technique provides fairly accurate results, additional improvements are desirable.

BRIEF DESCRIPTION OF THE DRAWINGS

FIG. 1 is a block diagram showing a prior-art training technique for identifying object classifiers.

FIG. 2 is a block diagram of a prior-art image detector that has been constructed in accordance with the training technique of FIG. 1.

DESCRIPTION OF THE PREFERRED EMBODIMENT(S)

Figure 3:
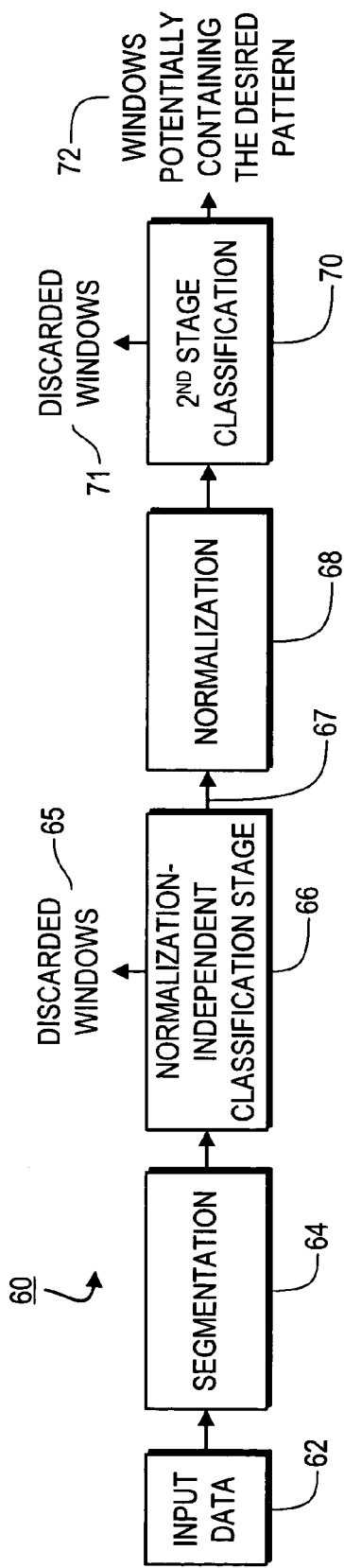
FIG. 3 is a block diagram showing a system for pattern recognition according to a representative embodiment of the present invention.

FIG. 3 illustrates a system 60 for performing pattern recognition according to a representative embodiment of the present invention. In this embodiment, input data 62 into system 60 comprises a number of digital photographs. However, in alternate embodiments input data 62 comprises, but is not limited to, any or all of: other types of image frames (e.g., images of individual letters for character recognition), three-dimensional image data, audio data, seismographic data, any signal or any other type of data within which one wishes to identify a specified pattern (e.g., an object).

Initially, the input data 62 are segmented into a plurality of windows in segmentation stage 64. It is noted that the term "windows" is used herein in its generic sense to refer to a collection of contiguous data and, depending upon the embodiment, may be one-dimensional (e.g., time intervals or data intervals) or may be multi-dimensional (e.g., rectangular-shaped blocks or other multi-dimensional shapes), as appropriate to the input data 62. In the present embodiment, such segmentation is performed using a predetermined technique that is independent of the specific input data 62. However, in alternate embodiments content-aware segmentation, together with any appropriate preprocessing, is performed in this step 64.

It is noted that in certain embodiments input data 62 will have inherent divisions, e.g., where input data 62 comprise multiple individual digital photographs or other image frames. In such cases, segmentation stage 64 further segments the input data 62 into a plurality of windows. For example, where input data 62 comprise different digital image frames, each such image frame preferably is segmented into a plurality of image windows.

In various representative embodiments, the windows generated in stage 64 have different sizes (e.g., lengths, for one-dimensional data) or different offsets, redundantly segmenting the image in a number of different ways. For example, a single image frame might be segmented by an array of contiguous 8×8 pixel blocks and then covered again by an array of 10×10 pixel blocks. Alternatively, a single image frame might be covered by a first array of contiguous 8×8 pixel blocks and then by a second array of 8×8 pixel blocks that is offset from the first set by a fixed number of pixels in each dimension. Such redundant segmentation generally increases the likelihood of capturing the desired pattern (e.g., object), if present in the input data, within a window that is not significantly larger than the pattern itself, e.g., so that the pattern is not lost among other features within the window.

Figure 4A:
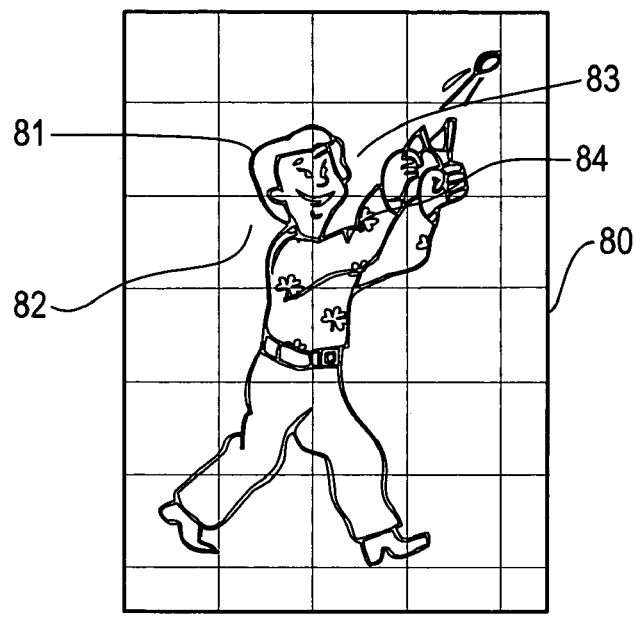
FIGS. 4A and B illustrate two different ways of segmenting the same image frame according to a representative embodiment of the present invention.
Figure 4B:
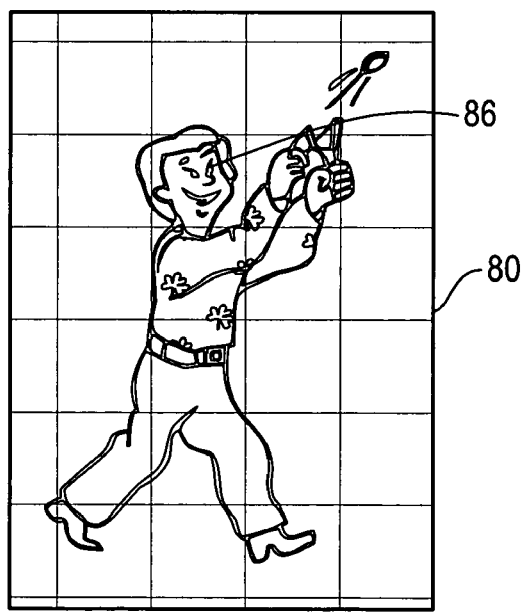

An example of such redundant segmentation is illustrated in FIGS. 4A and 4B. As illustrated in FIG. 4A, division of an image frame 80 into a single predetermined arrangement of windows might lead to the result that a single image of a face within the frame is divided into multiple different windows 81-84. However, by dividing the same image frame a number of different ways (e.g., using a number of different offsets), one can increase the likelihood that the entire face image will be contained within a single window. Thus, in the segmentation of image frame 80 shown in FIG. 4B a single window 86 includes the subject's entire face. Because it is not known at this stage where the faces are located in the image frame or what their relative sizes are, a number of different offsets (as shown in FIGS. 4A and 4B) can be utilized, as well as a number of different window sizes (not shown in FIGS. 4A and 4B).

Of course, not dividing an image frame at all would ensure that any images of faces would be included in the image frame. However, with such an approach very small facial images within a larger image frame would not be easily detected. That is, for most feature-based detectors or classifiers which rely upon a variety of such detectors, accurate detection requires the object or other pattern to be a certain minimum size relative to the size of the window.

Similarly, if the input data 62 comprise any other type of data (of any number of dimensions), the resulting windows can have a variety of different sizes and offsets (in such dimensions).

Normalization-independent classification stage 66 receives and processes the windows that are output from segmentation stage 64, in order to attempt to identify the desired object (with respect to image data) or other pattern in the subject window. It is noted that, unlike many conventional techniques, the processing performed by classification stage 66 is prior to any normalization of the input data 62 (or at least prior to the specific normalization that is to be performed in normalization stage 68, described below). Accordingly, classification stage 66 preferably uses one or more normalization-independent classifiers, as discussed in more detail below.

As used herein, "normalization" refers to any type of processing by which data windows are processed to achieve uniformity in some desired respect. Such normalization often is desired to facilitate meaningful comparisons between different windows or between a window and a specified reference window or other reference data. As discussed in more detail below, one aspect of the present invention is the separation of classifiers into a group that is performed prior to a particular type of normalization and a group that is performed after such normalization. In certain embodiments, multiple different types of normalization are performed and, with respect to each, any corresponding potential classifiers preferably are divided in this manner so as to increase overall processing speeds.

In one embodiment of the invention, classification stage 66 has a high detection rate (very low false-negative rate, e.g., <0.1% or even 0.01%). Optimally, the main goal of classification stage 66 is to eliminate any windows that clearly do not include the subject pattern, prior to normalization (or at least prior to the specific normalization that is to be performed in normalization stage 68, described below). As a result, at least some normalization processing with respect to such windows is avoided. Any windows 67 that meet the criteria of classification stage 66 tentatively (or provisionally) are identified as including the subject pattern and are provided to normalization stage 68 for additional processing. Any windows 65 that do not satisfy such criteria preferably are discarded and, therefore, not subject to any further processing.

In normalization stage 68, the input windows 67 are normalized in preparation for further processing. Preferably, such normalization involves scaling the signal values (e.g., pixel intensities or other measure of signal strength) within each incoming window so that the signal variation within the window (e.g., variance) is equalized across all windows, or at least all windows having the same size. With respect to image data, the effect of this type of normalization typically is to account for differences, e.g., in lighting. In alternative embodiments, other types of normalization are performed, either instead of or in addition to such scaling. For example, with respect to image data, such other types of normalization can include, but are not limited to, any or all of rotation, dimensional scaling or color balancing.

Finally, the normalized data are further processed in second classification stage 70. Because the data have been normalized, it generally will be possible to perform more selective classification in this stage 70 than was possible in classification stage 66. As a result, many of the previous false-positive detections are rejected 71 at this stage 70. Any window 72 that satisfies the criteria of classification stage 70 (or the larger data block, such as an image frame, to which it belongs, or both) is output, e.g., to an end user or to another device or software program.

By separating the classification processing into two separate classification stages 66 and 70 (one before and one after normalization stage 68), it often is possible to eliminate many windows 65 before the normalization stage 68, thereby saving processing time. Each such classification stage 66 and 70 preferably uses one or more binary classifiers. Each such binary classifier preferably either rejects an input window as not including the specified pattern or tentatively designates the window as including the pattern.

Figure 5:
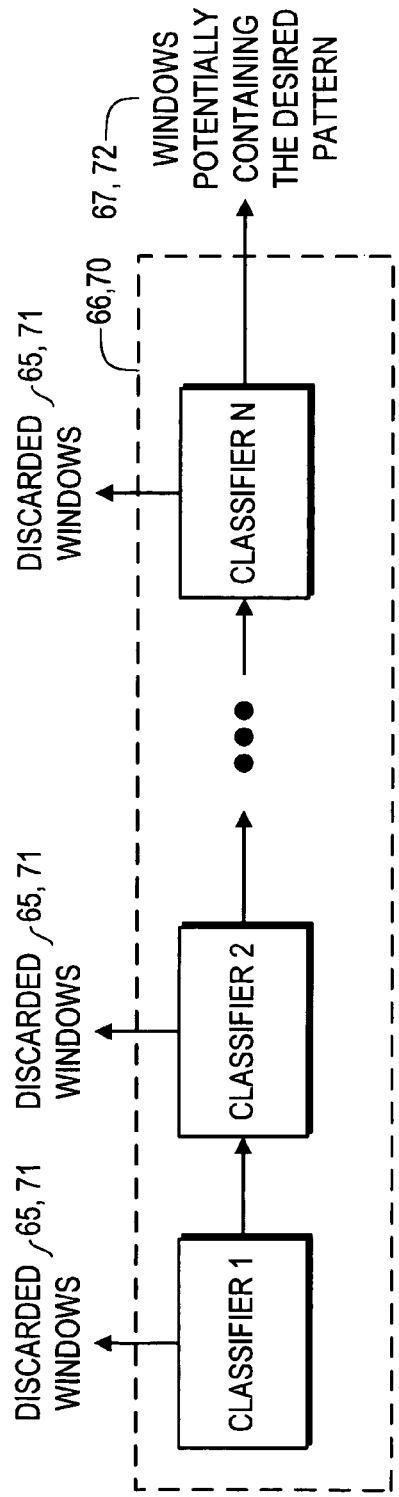
FIG. 5 is a block diagram showing two classification stages, according to a representative embodiment of the present invention.

FIG. 5 illustrates an exemplary configuration for each of classification stages 66 and 70. As shown, each such classification stage is comprised of a plurality of separate serially connected cascaded classifiers 1-N. In this case, it is preferred that the earlier classifiers in each stage (e.g., classifiers 1 and 2) perform less complicated processing, thereby rejecting the "easy" cases before having to devote significant processing time in the later stages (e.g., classifiers N-1 and N). Alternatively, in other embodiments either or both of classification stages 66 and 70 include only a single classifier.

Preferably, the classifiers used in stages 66 and 70 are constructed from a large group of potentially useful identification features using a training technique. As used herein, an "identification feature" or simply "feature" corresponds to a test for determining whether the subject window meets a specified criterion, and can be thought of as a mini-classifier. More preferably, the training technique involves: selecting the feature that most accurately classifies the examples in a given training set (e.g., with each example in the training set weighted equally); weighting the prediction made in accordance with such feature based on the feature's predictive accuracy; changing the weights assigned to the training set examples by decreasing the weights assigned to the examples that were correctly classified and increasing the weights assigned to the examples that were incorrectly classified; and then repeating the entire process by incrementally selecting another feature that most accurately classifies the examples, in accordance with their then-current weights. When a desired accuracy is achieved or when a maximum desired number of features has been reached the process is stopped and the classifier is constructed as a weighted combination of the predictions made by the individual features. An example of such a training technique is the well-known AdaBoost technique.

Figure 6:
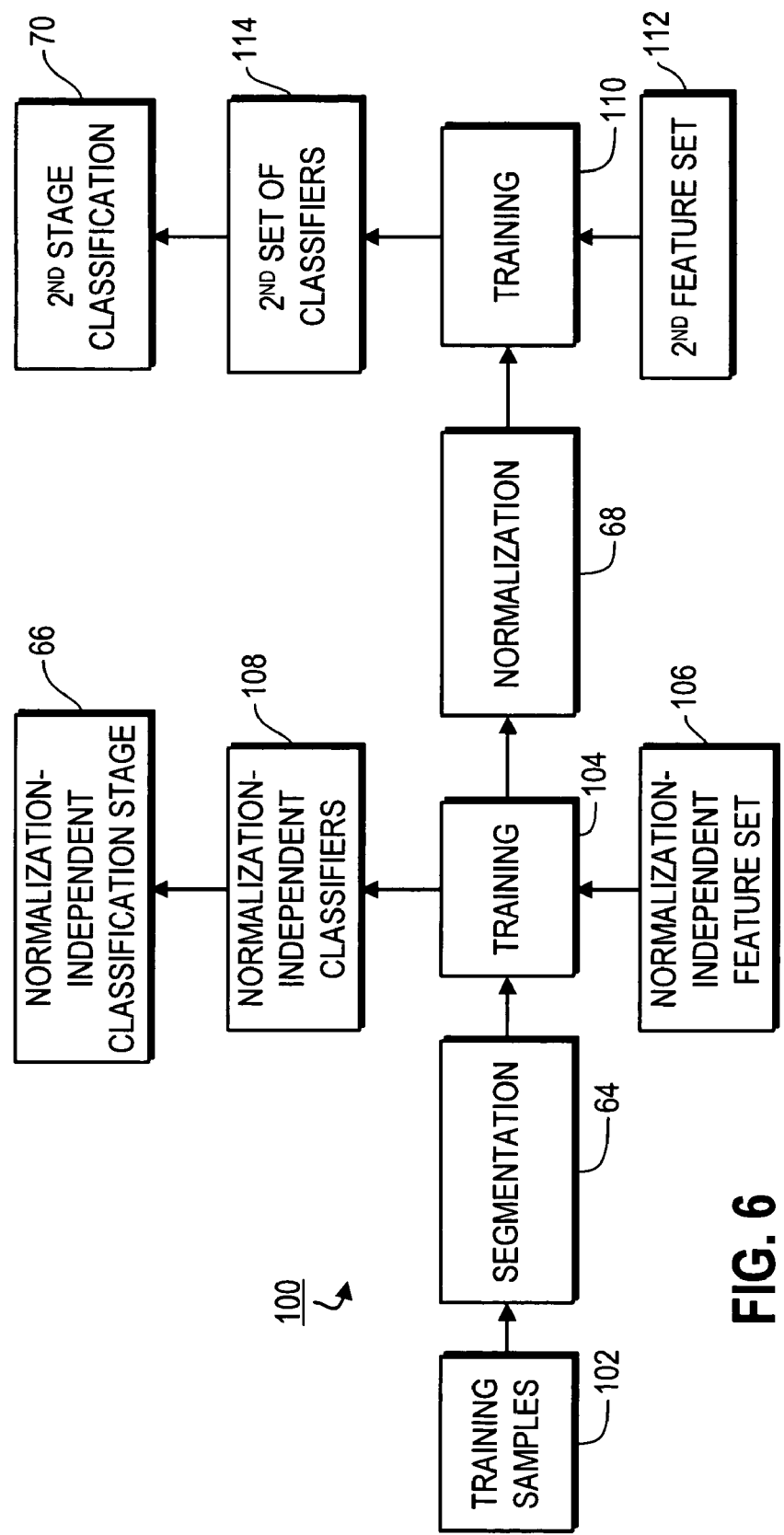
FIG. 6 is a block diagram showing a training technique for generating classifiers, according to a representative embodiment of the present invention.

As indicated above, in certain embodiments of the invention at least one of the classification stages (66 or 70) is constructed by adding features until one large classifier has been obtained (e.g., using a combination of tens or even hundreds of features). In other embodiments, at least one of the classification stages is constructed by creating multiple classifiers 1-N, each being based upon a smaller number of features. A more detailed discussion regarding a technique 100 for the construction of the system 60 shown in FIG. 3, according to a representative embodiment of the invention, is now presented with reference to FIG. 6.

The inputs to the technique 100 include training samples 102. In the preferred embodiments of the invention, training samples 102 are a random sampling of the data to be processed by the resulting system 60. Thus, for example, if it is ultimately desired to identify all images of faces from within a large collection of digital photographs or other image frames, training samples 102 preferably are a random sampling of such image frames. In alternative embodiments, training samples 102 comprise any or all of: individual audio clips, segments of other one-dimensional data, or blocks of data generated from any other type of sensor or combination of sensors or that has been observed. Ordinarily, training samples 102 will comprise a plurality of different blocks of data (e.g., individual image frames or other discrete blocks of data). However, in other embodiments of the invention training samples 102 comprise a single extended data block (e.g., weather data over some period of time).

In stage 64, the training samples 102 are segmented into individual windows that subsequently will be searched. The output of segmentation stage 64 is a collection of data or signal windows to be evaluated. It is noted that segmentation stage 64 preferably is identical to the identically numbered segmentation stage in the system 60 that ultimately is to be constructed.

Next, in training stage 104 the windows output by segmentation stage 64 are evaluated using a plurality of normalization-independent features 106 in order to find a combination of such features that best detects whether or not a desired object or other type of pattern is present in any or all of such windows. As noted above, such training preferably uses an AdaBoost training technique.

Figure 7A:
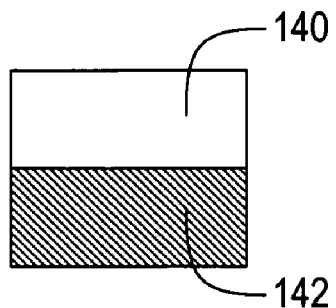
FIGS. 7A-I illustrate various normalization-independent pattern detection features that are used in a representative embodiment of the present invention.
Figure 7B:
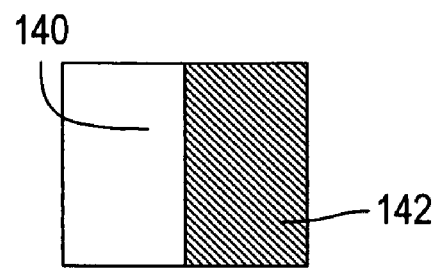
Figure 7C:
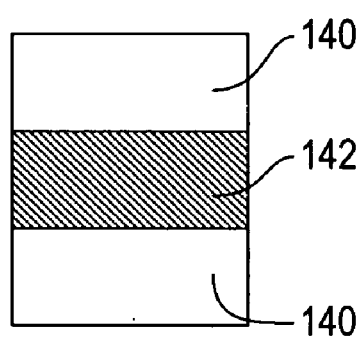
Figure 7D:
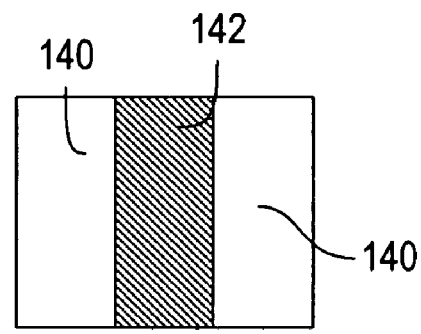
Figure 7E:
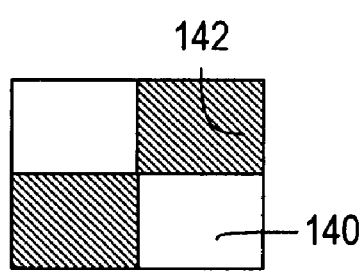
Figure 7F:
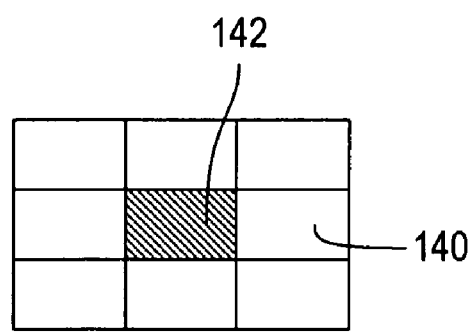
Figure 7G:
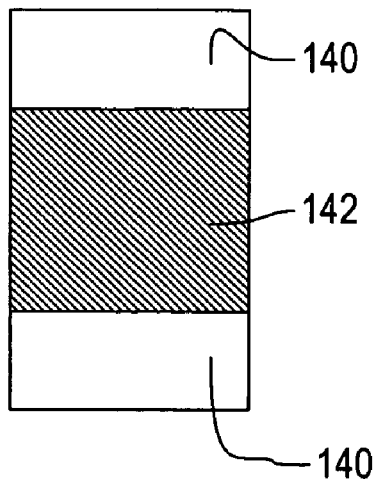
Figure 7H:
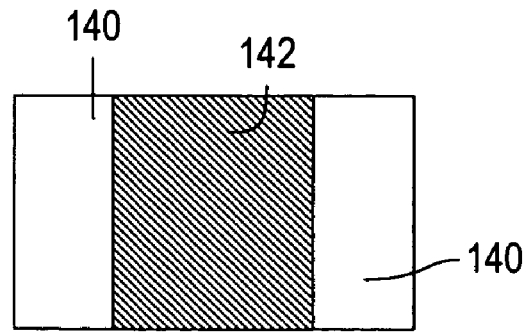
Figure 7I:
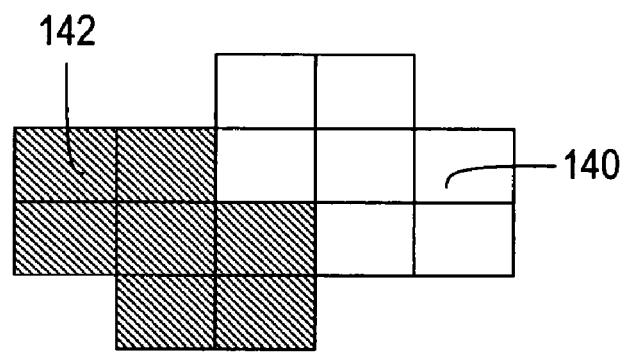

Preferably, each feature defined in set 106 is defined as the result $h_i$ of a comparison of a combination (or other function) $f_i$ of data values within a subject window to a fixed threshold. In a representative embodiment of the invention, the training data are a set of image frames, each window is all or a portion (typically rectangular) of one of the image frames, and the data values are intensities of individual pixels. In such an embodiment, some of the features that preferably are included in set 106 are whether the subject window contains: a horizontal top edge (as illustrated in FIG. 7A), a vertical left edge (as illustrated in FIG. 7B), a horizontal line (as illustrated in FIG. 7C), a vertical line (as illustrated in FIG. 7D), an upwardly sloping diagonal (as illustrated in FIG. 7E), a concentric structure (as illustrated in FIG. 7F), a wide horizontal line (as illustrated in FIG. 7G), a wide vertical line (as illustrated in FIG. 7H) and a downwardly sloping diagonal edge (as illustrated in FIG. 7I). In each of FIGS. 7A-I, the function $f_i$ is calculated by subtracting the average intensity of the all-white pixels 140 from the average intensity of the cross-hatched pixels 142.

More generally, each function $f_i$ preferably is a linear combination (i.e., a weighted sum of data values within the window), i.e., $$f_i = \sum_j c_j p_j, \text{ where}$$

$p_j$ are the data values across some set of points j within the window (pixels in the present example), and
$c_j$ is the weight specified for each data value $p_j$.

Then, we define a comparison function $h_i$ with respect to $f_i$ as follows:

$h_i(f_i, t_i) = 1$ if $f_i > t_i$;

where $t_i$ is a threshold value.

$h_i(f_i, t_i) = 0$ otherwise

In the preferred embodiments of the invention, $t_i$ is set equal to 0 for all features in set 106. As a result of using a threshold of 0 and using only a linear combination of $p_j$, each resulting feature detection will be independent to any uniform scaling applied across the entire window, i.e., if $f_i > 0$, then $Sf_i > 0$ for any arbitrary scaling factor S.

Accordingly, in this preferred embodiment each feature functions as a binary detector that is invariant to uniform scaling of the data values within the window. In alternate embodiments, other normalization-independent pattern-detection features instead, or in addition, are utilized. In any event, such features preferably are, selected so as to be independent of the type of normalization to be performed later in the processing.

In accordance with the present embodiment, all of the features are tested and the one that most accurately detects whether each of the input windows includes the desired pattern (e.g., as verified by user inspection) is selected, preferably with all of the input windows having been weighted equally. The selected feature is then weighted based upon its error rate. Next, the weights on all of the windows are adjusted, downwardly if the window was classified properly using the selected feature or upwardly if the window was classified improperly using the selected feature. The foregoing process then repeats to select and weight the next feature. The resulting features are combined to form a combined function of the form $$F(I) = \sum_n w_n * h(f_n, t_n), \text{ where}$$

$w_n$ are the weights that preferably have been generated from the AdaBoost technique.

This combined function is then used as the basis of a classifier H(I) as follows $H(I) = 1$ if $F(I) \leq T$ where 1 indicates a detection (at least tentative) that the subject $H(I) = 0$ otherwise pattern is present within the window, and T is a threshold controlling the tradeoff of detection rate and false alarm rate of the classifier H(I). That is, an affirmative hypothesis is generated only if the weighted average of the conclusions reached by the individual features indicates that the feature, more likely than not, is present in the window.

Any number of individual classifiers H(I) 108 may be generated and output in the foregoing manner, with each classifier 108 being based upon a number of features. If multiple classifiers 108 are in fact generated, then it generally will be preferable to construct the earlier-stage classifiers 108 so that they require less processing time than the later-stage classifiers. This is accomplished, in the various embodiments of the invention, using any combination of: (i) restricting the number of features that may be incorporated into the earlier-stage classifiers more stringently than the later-stage classifiers; or (ii) limiting the types of features (from feature set 106) that are available for the earlier-stage classifiers to those that require less processing time than are available to the later-stage classifiers.

The output classifier(s) 108 are then used to generate normalization-independent classification stage 66. If a single classifier has been generated, it functions as classification stage 66. On the other hand, if multiple classifiers 108 have been generated, they preferably are cascaded in the manner shown in FIG. 5 to produce normalization-independent classification stage 66.

Next, in normalization stage 68 the windows output from training stage 104 are normalized. In the preferred embodiments of the invention, only the windows that have been identified as potentially containing the desired pattern (i.e., in accordance with the generated classification stage 66) are forwarded on to normalization stage 68, thus mimicking what would occur in the resulting system 60.

Preferably, each of the input windows is normalized so as to equalize some measure of signal variation across the windows, or at least across similar windows (e.g., those of the same size). Thus, for example, in one embodiment of the invention for processing image data, all windows (or at least all similarly sized windows, e.g., all 16×16 pixel windows or all windows having 256 pixels) are scaled so that the standard deviation of the pixel intensity values in each such window is equal to 1 (or any other convenient constant).

In alternate embodiments, other types of normalization are performed in stage 68, e.g., rotational, feature size, etc. Also, in certain embodiments of the invention (such as described in the preceding paragraph) the normalization is based solely upon data values within the subject window. In alternate embodiments, normalization also is based upon data values outside of the subject window, such as by scaling pixel intensity values based upon a function of the pixel intensity variations across the entire image frame, rather than just variations within the subject window. In any event, normalization stage 68 preferably is identical to the identically numbered normalization stage in the resulting system 60.

Finally, the normalized windows output by normalization stage 68 are provided to training stage 110. The considerations pertaining to training stage 110 generally are identical to those discussed above with respect to training stage 104, except that the features within features set 112 need not be constrained so as to only normalization-independent features. That is, in the specific embodiment described above (i.e., in which AdaBoost training is utilized) the various thresholds t, need not be set to 0, and the functions $f_i$ need not be constrained to a simple linear combinations of data values, but instead may be more complicated functions of data values. Also, training stage 110 generally may be constructed similarly to conventional post-normalization AdaBoost training stages. As a result, a more detailed description of training stage 110 is not provided here.

While it is possible to include normalization-independent features in the available features set 112, it generally will be preferred to move the normalization-independent features into feature set 106 for use in training stage 104. Doing so often will enable the resulting system 60 to reject as many windows as possible prior to normalization stage 68.

In any event, the classifier(s) 114 output from training stage 110 are then used to generate second classification stage 70. If a single classifier has been generated, it functions as classification stage 70. On the other hand, if multiple classifiers 114 have been generated, they preferably are cascaded in the manner shown in FIG. 5 to produce classification stage 70.
System Environment.

It is noted that in the foregoing embodiment the features are selected from a large feature set in a systematic attempt to minimize classification error. However, in alternate embodiments some or all of the classification features are selected or combined on an ad hoc basis, in accordance with the designer's judgment regarding the best feature classifiers to utilize. In still further embodiments, a combination of these two techniques is utilized, e.g., with some of the features being specified by the designer and others being selected automatically to minimize some measure of error.

Generally speaking, nearly all of the methods and techniques described herein can be practiced with the use of a general-purpose computer system. Such a computer typically will include, for example, at least some of the following components interconnected with each other, e.g., via a common bus: one or more central processing units (CPUs), read-only memory (ROM), random access memory (RAM), input/output software or circuitry for interfacing with other devices and for connecting to one or more networks (which in turn, in many embodiments of the invention, connect to the Internet or to any other networks), a display (such as a cathode ray tube display, a liquid crystal display, an organic light-emitting display, a polymeric light-emitting display or any other thin-film display), other output devices (such as one or more of speakers, a headphone set or a printer), one or more input devices (such as a mouse, touchpad, tablet, touch-sensitive display or other pointing device; a keyboard, a microphone or a scanner), a mass storage unit (such as a hard disk drive), a real-time clock, a removable storage read/write device (such as for reading from and writing to RAM, a magnetic disk, a magnetic tape, an opto-magnetic disk, an optical disk, or the like), and a modem (which also can connect to the Internet or to any other computer network via a dial-up connection). In operation, the process steps to implement the above methods, to the extent performed by such a general-purpose computer, typically initially will be stored in mass storage (e.g., the hard disk), are downloaded into RAM and then executed by the CPU out of RAM.

Suitable computers for use in implementing the present invention may be obtained from various vendors. Various types of computers, however, may be used depending upon the size and complexity of the tasks. Suitable computers include mainframe computers, multiprocessor computers, workstations, personal computers, and even smaller computers such as PDAs, wireless telephones or any other appliance or device, whether stand-alone, hard-wired into a network or wirelessly connected to a network. In addition, although a general-purpose computer system has been described above, in alternate embodiments a special-purpose computer instead (or in addition) is used. In particular, any of the functionality described above can be implemented in software, hardware, firmware or any combination of these, with the particular implementation being selected based on known engineering tradeoffs.

In this regard, it is noted that the functionality described above primarily is implemented through fixed logical steps and therefore can be accomplished through programming (e.g., software or firmware), an appropriate arrangement of logic components (hardware) or any combination of the two, as is well-known in the art. For example, in various embodiments of the invention each of the processing stages 64, 66, 68 or 70 shown in FIG. 3 is implemented: entirely in software or firmware, entirely in hardware, or in any combination of software, firmware or hardware.

It should be understood that the present invention also relates to machine-readable media on which are stored program instructions for performing the methods of this invention. Such media include, by way of example, magnetic disks, magnetic tape, optically readable media such as CD ROMs and DVD ROMs, semiconductor memory such as PCMCIA cards, etc. In each case, the medium may take the form of a portable item such as a small disk, diskette, cassette, etc., or it may take the form of a relatively larger or immobile item such as a hard disk drive, ROM or RAM provided in a computer.

The foregoing description primarily emphasizes electronic computers. However, it should be understood that any other type of computer instead may be used, such as a computer utilizing any combination of electronic, optical, biological or chemical processing.
Additional Considerations.

Several different embodiments of the present invention are described above, with each such embodiment described as including certain features. However, it is intended that the features described in connection with the discussion of any single embodiment are not limited to that embodiment but may be included and arranged in various combinations in any of the other embodiments as well, as will be understood by those skilled in the art.

Similarly, in the discussion above, functionality sometimes is ascribed to a particular module or component. However, functionality generally may be redistributed as desired among any different modules or components, in some cases completely obviating the need for a particular component or module, requiring the addition of new components or modules, or both. The precise distribution of functionality preferably is made according to known engineering tradeoffs, with reference to the specific embodiment of the invention, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. An apparatus for recognizing a pattern within input data, comprising:
   a processor configured to implement stages of the apparatus, including
   a segmentation stage configured to segment input data into a plurality of windows of data without applying a classification criterion to reject any of the windows;
   a normalization-independent classification stage configured to receive the plurality of windows of data but not the input data and apply at least one normalization-independent classification criterion predetermined from training data to each individual one of the plurality of windows and to reject any window that does not satisfy the at least one normalization-independent classification criterion, wherein the at least one normalization-independent classification criterion comprises, for each one of a plurality of predictive features of the criterion, comparing a linear combination of data values within a subject window to a fixed threshold of 0, such that a classification generated by applying the criterion to the subject window is independent of any uniform scaling of the subject window;
   a normalization stage configured to normalize the windows that were not rejected by the normalization-independent classification stage by scaling the corresponding input data to substantially equalize variance in the input data across a plurality of the non-rejected windows, and not to normalize the rejected windows; and
   a second classification stage configured to receive the plurality of variance-equalized non-rejected windows of data but not the input data and apply at least one normalization-dependent classification criterion to the normalized windows and to identify any window that satisfies the at least one normalization-dependent classification criterion.

2. An apparatus according to claim 1, wherein the normalization stage normalizes a subject window by multiplying data values within the subject window by a scaling factor.

3. An apparatus according to claim 2, wherein the scaling factor is selected so as to equalize variations in data values across a plurality of windows.

4. An apparatus according to claim 2, wherein the scaling factor is a function of data values for a portion of the input data that includes, but is larger than, the window being scaled.

5. An apparatus according to claim 1, wherein the normalization-independent classification stage uses results from a plurality of normalization-independent classifiers for determining whether to reject or to provisionally accept a window.

6. An apparatus according to claim 5, wherein the normalization-independent classifiers are cascaded so that the output of one is used as the input of another.

7. An apparatus according to claim 5, wherein the plurality of normalization-independent classifiers have been selected from a larger set of potential normalization-independent classifiers using a training data set.

8. An apparatus according to claim 5, wherein the normalization-independent classifiers have been selected using an AdaBoost technique.

9. An apparatus according to claim 1, wherein the segmentation stage is configured to output a plurality of overlapping differently sized windows.

10. An apparatus according to claim 1, wherein the normalization-independent classification stage includes only normalization-independent classification criteria and the second classification stage includes only normalization-dependent classification criteria.

11. An apparatus according to claim 1, wherein the input data comprise an image frame.

12. A non-transitory processor-readable medium having processor-executable instructions thereon which, when executed by a processor, cause the processor to perform the steps of:
   (a) obtaining a set of training data;
   (b) segmenting the training data into a plurality of windows of data without applying a classification criterion to reject any of the windows;
   (c) processing the windows to identify at least one normalization-independent classifier that comprises, for each one of a plurality of predictive features of the normalization-independent classifier usable to accept or reject an individual subject window, comparing a linear combination of data values within the subject window to a fixed threshold of 0, such that a classification generated by applying the normalization-independent classifier to the subject window is independent of any uniform scaling of the subject window;
   (d) normalizing the windows by scaling the corresponding training data to substantially equalize variance in the training data across a plurality of the windows;
   (e) processing the normalized windows to identify at least one normalization-dependent classifier; and
   (f) constructing a pattern-recognition system for identifying patterns within input data in which the identified at least one normalization-independent classifier is used to pre-screen windows before normalizing and applying the at least one normalization-dependent classifier to any remaining windows.

13. A medium according to claim 12, wherein the normalizing step (d) normalizes windows by multiplying data values by a scaling factor.

14. A medium according to claim 13, wherein the scaling factor is selected so as to equalize variations in data values across a plurality of windows.

15. A medium according to claim 12, wherein a plurality of normalization-independent classifiers is identified in step (c).

16. A medium according to claim 15, wherein in step (f) the identified normalization-independent classifiers are cascaded so that the output of one is used as the input of another.

17. A medium according to claim 15, wherein in step (c) the plurality of normalization-independent classifiers are selected from a larger set of potential normalization-independent classifiers.

18. A medium according to claim 15, wherein the normalization-independent classifiers are selected using an AdaBoost technique.

19. A medium according to claim 12, wherein in step (b) the training data are segmented into a plurality of overlapping differently sized windows.

20. A non-transitory processor-readable medium having processor-executable instructions thereon which, when executed by a processor, cause the processor to perform the steps of:
(a) segmenting input data into a plurality of windows without applying a classification criterion to reject any of the windows;
(b) applying at least one normalization-independent classification criterion to the plurality of windows and rejecting any window that does not satisfy the at least one normalization-independent classification criterion, wherein the at least one normalization-independent classification criterion usable to accept or reject an individual subject window comprises, for each one of a plurality of predictive features of the criterion, comparing a linear combination of data values within the subject window to a fixed threshold of 0, such that a classification generated by applying the criterion to the subject window is independent of any uniform scaling of the subject window;
(c) normalizing the windows that were not rejected by said step (b), but not the rejected windows, by scaling the corresponding input data to substantially equalize variance in the input data across a plurality of the non-rejected windows; and
(d) applying at least one normalization-dependent classification criterion to the normalized windows and identifying any window that satisfies the at least one normalization-dependent classification criterion so as to recognize a pattern within the input data.

21. A medium according to claim 20, wherein the normalizing step (c) normalizes windows by multiplying data values by a scaling factor.

22. A medium according to claim 21, wherein the scaling factor is selected so as to equalize variations in data values across a plurality of windows.

23. A medium according to claim 20, wherein step (b) utilizes only normalization-independent classification criteria and step (d) utilizes only normalization-dependent classification criteria.

24. A medium according to claim 20, wherein the input data comprise an image frame.

25. An apparatus for recognizing a pattern within input data, comprising:
segmentation means for segmenting input data into a plurality of windows without applying a classification criterion to reject any of the windows;
normalization-independent classification means for receiving the plurality of windows of data but not the input data and applying at least one normalization-independent classification criterion predetermined from training data to each individual one of the plurality of windows and rejecting any window that does not satisfy the at least one normalization-independent classification criterion, wherein the at least one normalization-independent classification criterion comprises, for each one of a plurality of predictive features of the criterion, comparing a linear combination of data values within a subject window to a fixed threshold of 0, such that a classification generated by applying the criterion to the subject window is independent of any uniform scaling of the subject window;
normalization means for normalizing the windows that were not rejected by said normalization-independent classification means, but not the rejected windows, by scaling the corresponding input data to substantially equalize variance in the input data across a plurality of the non-rejected windows; and
normalization-dependent classification means for receiving the plurality of variance-equalized non-rejected windows of data but not the input data and applying at least one normalization-dependent classification criterion to the normalized windows and identifying any window that satisfies the at least one normalization-dependent classification criterion.

26. An apparatus according to claim 1, wherein the input data comprises at least one image frame, and wherein the comparison further comprises comparing the linear combination of data values within the subject window of one image frame to a fixed threshold of 0.

* * * * *